(12) United States Patent
Zeng et al.

(10) Patent No.: US 8,441,825 B2
(45) Date of Patent: May 14, 2013

(54) H-BRIDGE CIRCUIT HAVING ENERGY COMPENSATION CIRCUIT AND CONTROLLING METHOD THEREOF

(75) Inventors: Jianhong Zeng, Shanghai (CN); Qikun Wu, Shanghai (CN); Nan Ye, Shanghai (CN); Hongyuan Jin, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 799 days.

(21) Appl. No.: 12/621,855

(22) Filed: Nov. 19, 2009

(65) Prior Publication Data

US 2010/0124085 A1 May 20, 2010

(30) Foreign Application Priority Data

Nov. 19, 2008 (TW) ................................. 97144776 A

(51) Int. Cl.
*H02M 7/5387* (2007.01)
*H02M 3/24* (2006.01)

(52) U.S. Cl.
USPC ............................................ 363/132; 363/98

(58) Field of Classification Search ................ 363/95, 363/97, 98, 131, 132
See application file for complete search history.

(56) References Cited

U.S. PATENT DOCUMENTS

| | | | |
|---|---|---|---|
| 6,801,063 B1 | 10/2004 | Guo | |
| 7,741,901 B2* | 6/2010 | Lu et al. | 327/589 |
| 2008/0218141 A1 | 9/2008 | Lu et al. | |
| 2010/0259957 A1* | 10/2010 | Jin et al. | 363/126 |
| 2011/0260707 A1* | 10/2011 | Imanishi et al. | 323/311 |

FOREIGN PATENT DOCUMENTS

| | | |
|---|---|---|
| CN | 101083398 A | 12/2007 |
| TW | 200835125 A | 8/2008 |

* cited by examiner

*Primary Examiner* — Matthew Nguyen
(74) *Attorney, Agent, or Firm* — Volpe and Koenig, P.C.

(57) ABSTRACT

The configurations of an H-bridge circuit and a controlling method thereof are provided in the present invention. The proposed circuit includes an H-bridge having a first and a second bridge arms, each of which has a middle point, and a bidirectional switch connected to the two middle points, a bootstrap circuit providing a bootstrap voltage, a driving circuit receiving the bootstrap voltage and driving the bidirectional switch, and an energy compensation circuit coupled to the H-bridge, the bootstrap circuit and the driving circuit, and providing a compensation energy to the bootstrap circuit.

17 Claims, 9 Drawing Sheets

US 8,441,825 B2

H-BRIDGE CIRCUIT HAVING ENERGY COMPENSATION CIRCUIT AND CONTROLLING METHOD THEREOF

FIELD OF THE INVENTION

The present invention relates to an H-bridge circuit with an energy-compensation circuit and a controlling method thereof. More particularly, it relates to an H-bridge circuit having an auxiliary energy-compensation circuit with a bootstrapped driver circuit.

BACKGROUND OF THE INVENTION

For achieving the higher efficiency and power density, the H-bridge power factor correction (PFC) circuit possesses a trend of replacing the conventional boost PFC circuit nowadays.

As an example, for an H-bridge PFC circuit in FIG. 1, its on-state loss is smaller than that of a conventional boost PFC circuit, i.e. a conventional rectifier bridge pluses a boost circuit structure. Since the rectifier bridge is omitted in the H-bridge PFC, the efficiency of the circuit is increased dramatically.

FIG. 1 shows a circuit diagram of an H-bridge PFC circuit in the prior art, which possesses a higher efficiency while comparing with the conventional boost PFC circuit. In FIG. 1, Vin is an AC power source; Vout is an output voltage; L is an inductor; C1 is an output capacitor; D1, D2, D3 and D4 are rectifier diodes, which form two bridge arms of an H-bridge. T1 and T2 are two switch elements of the H-bridge, and the series-connected T1 and T2 form a bidirectional switch. As an example, the bidirectional switch comprises the two inverse series-connected MOSFETs as shown in FIG. 1. The bidirectional switch connects to the middle points A and B of the two bridge arms with the anodes of their body diodes connected together. And the middle point A connects to Vin through the inductor L, while B connects to Vin directly. T1 and T2 are turned on and off simultaneously. The AC input voltage charges the inductor L when T1 and T2 are turned on and at the same time the four rectifier diodes D1, D2, D3 and D4 are off. If T1 and T2 are turned off and the voltage value at A is larger than that at B, D1 and D3 are turned on, D2 and D4 are turned off and the inductor L outputs energy to the output capacitor C1. If T1 and T2 are turned off and the voltage value at B is larger than that at A, D2 and D4 are turned on, D1 and D3 are turned off and the inductor L also outputs energy to the output capacitor C1.

In the circuit of FIG. 1, the two switches T1 and T2 are driven under floating ground structure, and a conventional bootstrap driver circuit, such as circuits in the blocks 1 and 2 of FIG. 3(a), can be employed. As shown in the block 1 of FIG. 3(a), a conventional bootstrap circuit includes capacitors C2, C3 and a bootstrap switch element such as diode D5. Capacitor C3 is a bootstrap capacitor, and a bootstrap voltage across this capacitor provides energy to drive the two switches. And the energy in the capacitor C2 is charged to C3 through the bootstrap diode D5. As shown in the block 2 of FIG. 3(a), a conventional driving circuit provides gate driving pulses to the two switches T1 and T2, which could be any of the driving circuit structures known by the person with the ordinary skill in the art. In the H-bridge circuit as shown in FIG. 3(a), terminal S connects to terminal G either through the body diode of T2 and diode D3 (when the value at A is larger than that at B), or through the body diode of T1 and diode D4 (when the voltage value at B is larger than that at A) when the two switches T1 and T2 are turned off. At this moment, S and G have almost the same voltage potential, diode D5 is on, and the energy stored in the storage capacitor C2 charges the bootstrap capacitor C3 through diode D5. When T1 and T2 are turned on, S floats (not connected to G) and the energy stored in capacitor C3 from the above-mentioned process is to provide energy to the driving circuit in the block 2 of FIG. 3(a).

FIG. 2 shows a circuit diagram of another H-bridge PFC circuit in the prior art. Output capacitors C1 and C4 are connected in series and forms a bridge arm; and rectifier diodes D1 and D4 form another bridge arm. T1 and T2 are two series-connected switch elements to form a bidirectional switch which connects the middle points of the two bridge arms A and B. And A connects to Vin through the inductor L, and B connects to Vin directly. T1 and T2 are turned on and off simultaneously. The AC input voltage charges the inductor L and the rectifier diodes D1 and D4 are turned off when T1 and T2 are turned on. If the voltage value at A is larger than that at B, D1 is on, D4 is off and the inductor L outputs energy to the output capacitor C1 when T1 and T2 are turned off. If the voltage value at B is larger than that at A, D4 is on, D1 is off and the inductor L also outputs energy to the output capacitor C4 when T1 and T2 are turned off.

In the circuit of FIG. 2, the two switches T1 and T2 are driven under floating ground structure too, and a conventional bootstrap driver circuit, such as circuits in the blocks 1 and 2 of FIG. 3(b), can also be employed.

The bootstrapped driver circuit can only operate normally under the condition that a bootstrap path is provided. The bootstrap path of the H-bridge circuit in FIG. 3(a) would be lost under certain circumstances. For example, under the unloaded condition, light loaded condition, or around the zero-crossings of AC input voltage, the diodes D3 or D4 on the bridge arms is off due to lack of sufficient current. Thus, S and G could not form almost the same voltage potential, and then the bootstrap path could not be formed. Then, C3 could not obtain the energy from C2 through D5, and could not provide energy to the driving circuit in the block 2 of FIG. 3(a). Besides, there are circumstances that the bootstrap path might be lost e.g. during the starting stage of the H-bridge PFC circuit in FIG. 3(a). Since at the beginning of the starting stage, T1 and T2 are not operated, and the AC input voltage engages the uncontrollable rectification through diodes D1, D2, D3 and D4 to charge C1. And then the uncontrollable rectification is stopped and diodes D1, D2, D3 and D4 are off when C1 is charged to the peak value of the AC input voltage. If the voltage across the bootstrap capacitor C3 is not built up at the moment which means the voltage across C3 is not enough to provide energy to the driving circuit to drive switch T1, T2, the bootstrap path is not existed since diodes D1, D2, D3 and D4 are off even if the voltage across capacitor C2 is built up.

Similar problems could also appear in the H-bridge circuit of FIG. 3(b).

The above-mentioned H-bridge circuits are mainly applied to the PFC circuits. Actually, the applications of the H-bridge circuits are not limited to this, and the H-bridge circuits could be applied to all the circuits with AC input and DC output. But no matter what occasion, there are possibilities that the above-mentioned problems exist as far as the conventional bootstrapped driving mode is employed.

Keeping the drawbacks of the prior arts in mind, and employing experiments and research full-heartily and persistently, the applicant finally conceived an H-bridge circuit having an energy compensation circuit and a controlling method thereof.

SUMMARY OF THE INVENTION

It is therefore an object of the present invention to provide an H-bridge PFC circuit having a bootstrap circuit with a bootstrap capacitor and an auxiliary circuit, and a controlling method thereof, and the auxiliary circuit provides compensation energy to the bootstrap circuit while the voltage across the bootstrap capacitor of the H-bridge PFC circuit is insufficient such that the operational reliability of the bootstrap circuit could be efficiently raised.

According to the first aspect of the present invention, an H-bridge circuit includes an AC power source having a first and a second terminals, an H-bridge including a first and a second bridge arms, each of which has a first and a second terminals and a middle point, wherein the first terminal of the first bridge arm connects the first terminal of the second bridge arm, the second terminal of the first bridge arm connects the second terminal of the second bridge arm, and the middle point of the first bridge arm and the middle point of the second bridge arm connect the first and the second terminals of the AC power source respectively, and a bidirectional switch connected between the two middle points, a bootstrap circuit providing a bootstrap voltage, a driving circuit receiving the bootstrap voltage and driving the bidirectional switch, and an energy compensation circuit coupled to the H-bridge, the bootstrap circuit and the driving circuit, and providing a compensation energy to the bootstrap circuit.

Preferably, the bootstrap circuit comprises a bootstrap capacitor having a first terminal and a second terminal connected to the bidirectional switch, and the bootstrap voltage is a voltage across the bootstrap capacitor.

Preferably, the bootstrap circuit further comprises a bootstrap switch having a first terminal and a second terminal connected to the first terminal of the bootstrap capacitor, and a storage capacitor having a first terminal connected to the first terminal of the bootstrap switch and a second terminal connected to the second terminals of the first and the second bridge arms.

Preferably, the energy compensation circuit comprises a first, a second and a third terminals, the first and the second terminals connect to the AC power source, and the second and the third terminals connect to provide an energy to the bootstrap capacitor.

Preferably, the energy compensation circuit comprises a switch element and provides a reference voltage, and the switch element is controlled through comparing the bootstrap voltage with the reference voltage so as to provide the compensation energy to the bootstrap circuit.

Preferably, the switch element is turned on and the energy compensation circuit provides the compensation energy to the bootstrap circuit when the bootstrap voltage is lower than the reference voltage, and the switch element is turned off when the bootstrap voltage is higher than the reference voltage such that the energy compensation circuit ceases to provide the compensation energy to the bootstrap circuit.

Preferably, the first terminal of the energy compensation circuit connects to the first terminal of the first bridge arm of the H-bridge, the second terminal of the energy compensation circuit connects to the second terminal of the bootstrap capacitor, and the third terminal of the energy compensation circuit connects to the first terminal of the bootstrap capacitor.

Preferably, the first terminal of the energy compensation circuit connects to the middle point of the first bridge arm of the H-bridge, the second terminal of the energy compensation circuit connects to the second terminal of the bootstrap capacitor, and the third terminal of the energy compensation circuit connects to the first terminal of the bootstrap capacitor.

Preferably, the first terminal of the energy compensation circuit connects to the middle point of the second bridge arm of the H-bridge, the second terminal of the energy compensation circuit connects to the second terminal of the bootstrap capacitor, and the third terminal of the energy compensation circuit connects to the first terminal of the bootstrap capacitor.

Preferably, the bidirectional switch comprises a first switch and a second switch connected to the first switch in series, and the first and the second switches are two inverse series-connected MOSFETs.

Preferably, the energy compensation circuit further comprises a first and a second resistors, each of which has a first and a second terminals, a diode having an anode connected to the second terminal of the energy compensation circuit, a cathode and a stabilized voltage, and a switch element having a first terminal connected to the second terminal of the first resistor, a second terminal connected to the third terminal of the energy compensation circuit and a control terminal connected to the second terminal of the second resistor and the cathode of the diode, the first terminals of the first and the second resistors are both connected to the first terminal of the energy compensation circuit, and the energy compensation circuit controls the switch element by comparing the bootstrap voltage with the stabilized voltage of the diode so as to provide the compensation energy to the bootstrap circuit.

Preferably, the switch element is a third switch, the energy compensation circuit further comprises a fourth switch having a first terminal connected to the cathode of the diode, a second terminal connected to the anode of the diode and a control terminal receiving a control signal of the bidirectional switch, the fourth switch is turned on when the control signal of the bidirectional switch is at a high level, and the fourth switch is turned off when the control signal of the bidirectional switch is at a low level such that the energy compensation circuit turns into a controllable circuit operated intermittently.

Preferably, the energy compensation circuit further comprises a resistor having a first terminal connected to the first terminal of the energy compensation circuit and a second terminal, a comparator having a non-inverting input terminal, an inverting input terminal and an output terminal, a reference voltage device providing a reference voltage and having a first terminal connected to the non-inverting input terminal of the comparator and a second terminal connected to the second terminal of the energy compensation circuit, and a switch element having a first terminal connected to the second terminal of the resistor, a second terminal connected to the third terminal of the energy compensation circuit and the inverting input terminal of the comparator, and a control terminal connected to the output terminal of the comparator, and the energy compensation circuit controls the switch element through comparing the bootstrap voltage with the reference voltage so as to provide the compensation energy to the bootstrap circuit.

Preferably, the circuit further comprises an output capacitor having a first terminal and a second terminal, wherein the first bridge arm further comprises a first and a fourth diodes, the second bridge arm further comprises a second and a third diodes, each of the diodes has an anode and a cathode, the cathode of the first diode connects to the cathode of the second diode and the first terminal of the output capacitor, the anode of the first diode connects to the cathode of the fourth diode to form the middle point of the first bridge arm, the anode of the second diode connects to the cathode of the third diode to form the middle point of the second bridge arm, and the anode of the fourth diode connects to the anode of the third diode and the second terminal of the output capacitor.

Preferably, the first bridge arm further comprises a first and a second diodes, the second bridge arm further comprises a first and a second output capacitors, each of the diodes has an anode and a cathode and each of the capacitors has a first terminal and a second terminal, the cathode of the first diode connects to the first terminal of the first output capacitor, the anode of the first diode connects to the cathode of the second diode to form the middle point of the first bridge arm, the second terminal of the first output capacitor connects to the first terminal of the second output capacitor to form the middle point of the second bridge arm, and the anode of the second diode connects to the second terminal of the second output capacitor.

Preferably, the circuit is an H-bridge power factor correction circuit.

According to the second aspect of the present invention, a controlling method for an H-bridge circuit comprising an H-bridge having a bidirectional switch, a bootstrap circuit, a driving circuit and an energy compensation circuit comprises the steps of: providing a bootstrap voltage by the bootstrap circuit; receiving the bootstrap voltage by the driving circuit to drive the bidirectional switch; and raising the bootstrap voltage to a first predetermined value by providing an energy to the bootstrap circuit through the energy compensation circuit when the bootstrap voltage is lower than a second predetermined value.

Preferably, the raising step further comprises the steps of: turning on the switch element to charge and store an energy in the bootstrap capacitor when the bootstrap voltage is lower than the second predetermined value; turning off the switch element when the bootstrap voltage is larger than the first predetermined value.

Preferably, the raising step further comprises the steps of: turning on the fourth switch to turn off the third switch so as to cease an operation of the energy compensation circuit when the control signal of the bidirectional switch is at the relatively high level; and turning off the fourth switch to turn on the third switch so as to begin the operation of the energy compensation circuit when the control signal of the bidirectional switch is at the relatively low level, wherein the control signal is a pulse signal.

The present invention may best be understood through the following descriptions with reference to the accompanying drawings, in which:

DETAILED DESCRIPTION OF THE PREFERRED EMBODIMENT

Figure 4A:
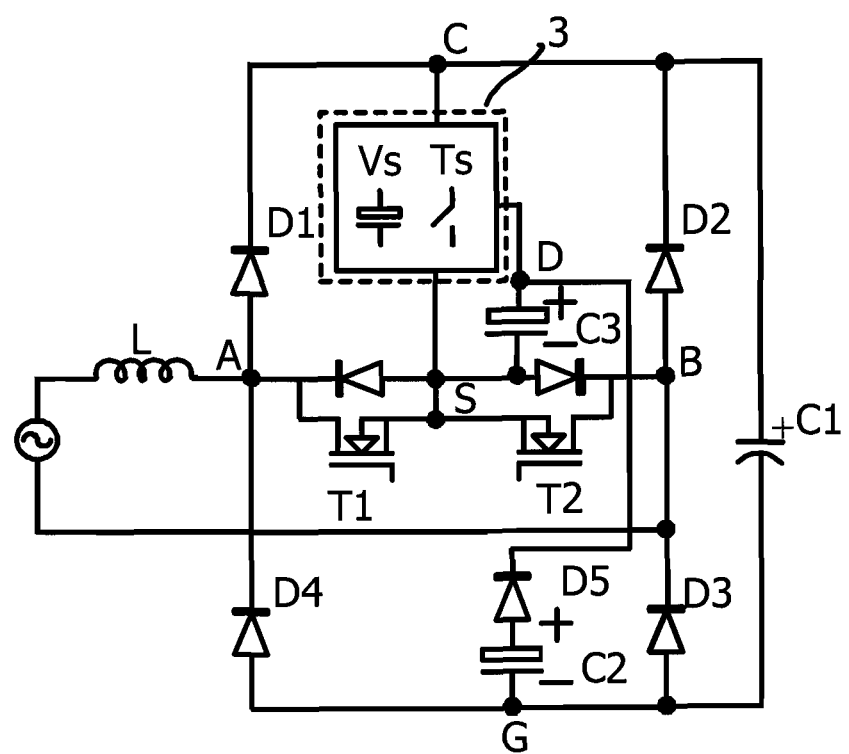
FIG. 4(a) shows a schematic circuit diagram of the H-bridge PFC circuit in FIG. 1 with an energy compensation circuit added according to the first preferred embodiment of the present invention.
Figure 4B:
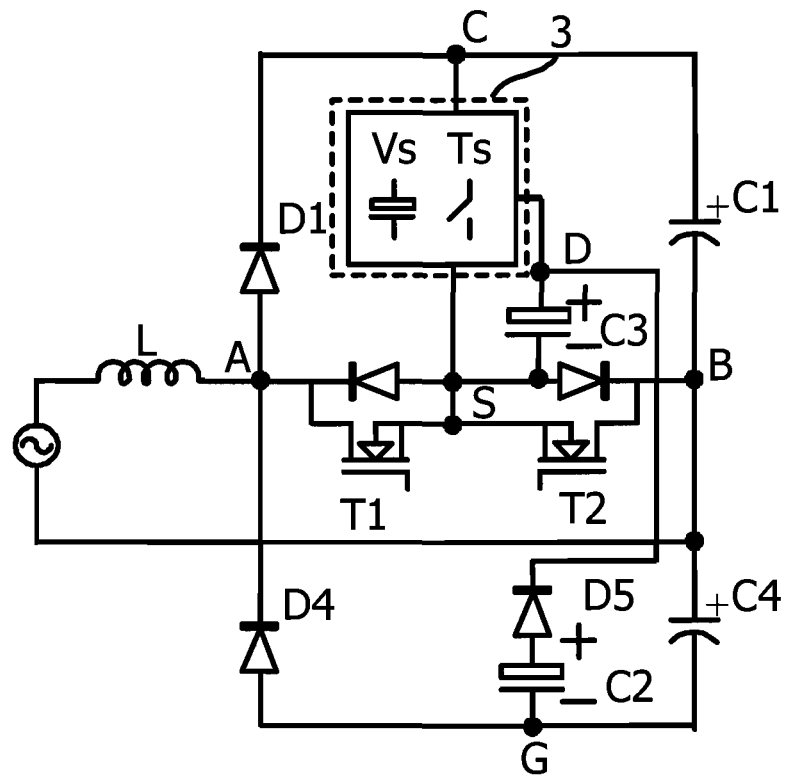
FIG. 4(b) shows a schematic circuit diagram of the H-bridge PFC circuit in FIG. 2 with an energy compensation circuit added according to the second preferred embodiment of the present invention.

To compensate the aforementioned drawbacks, FIGS. 4(a) and 4(b) provide auxiliary energy supply circuits of bootstrap driver circuit with floating ground structure in an H-bridge circuit of the present invention, each of which provides an auxiliary energy compensation path of a bootstrap circuit to compensate energy to the bootstrap circuit which effectively raises the operational reliability of bootstrap circuit.

The circuits as shown in the dash-lined block 3 of FIGS. 4(a) and 4(b) are energy compensation circuits of bootstrap circuit, each of which is a three-terminal network including input and output terminals, wherein the input terminals receive energy from the other power source such as the AC power source and provide energy to the three-terminal network, and the output terminals provide energy to the bootstrap capacitor. The three-terminal network in the block 3 includes a reference voltage device providing a reference voltage Vs and a switch element Ts. The operational principles of the three-terminal network are: comparing the voltage across the bootstrap capacitor C3 with the reference voltage Vs; and controlling the on and off of the Ts according to the results of comparison. For example, the three-terminal network begins to operate and controls Ts to be turned on and the output terminals output energy to C3 when the voltage across C3 is lower than the reference voltage Vs. The three-terminal network is not operated and controls Ts to be turned off and the output terminals do not output energy when the voltage across C3 is higher than the reference voltage Vs. The three-terminal network in the block 3 could be realized by various circuits known by the person with ordinary skill in the art.

The input terminals of this three-terminal network could have various connection methods. In FIG. 4(a), C and S are input terminals, and D and S are output terminals. The current flows by the following loop: A->D1->C->three-terminal network->S->the body diode of T2->B when the voltage value at A is larger than that at B. When the voltage value at B is larger than that at A, the current flows by the following loop: B->D2->C->three-terminal network->S->the body diode of T1->A.

In FIG. 4(b), C and S are input terminals, D and S are output terminals. The current flows by the following loop: A->D1->C->three-terminal network->S->the body diode of T2->B when the voltage value at A is larger than that at B.

In FIGS. 4(a) and 4(b), the input terminals of the three-terminal network could be changed to A and S, and output terminals are D and S. Then the current flowing loop is A->three-terminal network->S->the body diode of T2->B when the voltage value at A is larger than that at B.

In FIGS. 4(a) and 4(b), the input terminals of the three-terminal network could also be changed to B and S, and output terminals are D and S. Then the current flowing loop is B->three-terminal network->S->the body diode of T1->A when the voltage value at B is larger than that at A.

Figure 1:
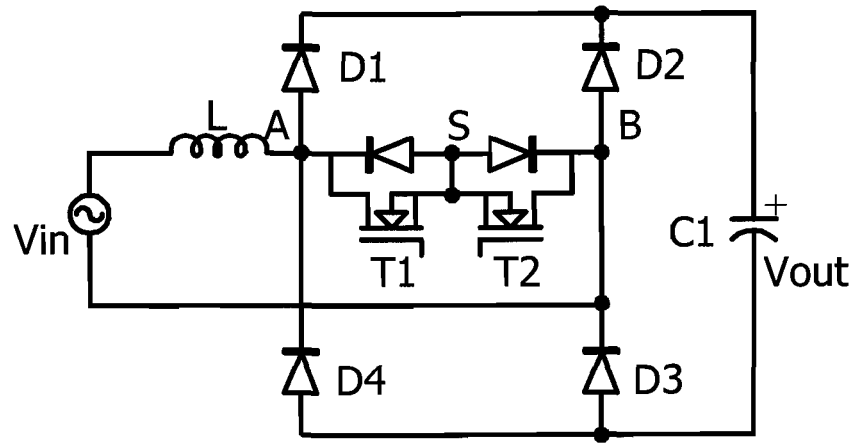
FIG. 1 shows a circuit diagram of an H-bridge PFC circuit in the prior art.
Figure 2:
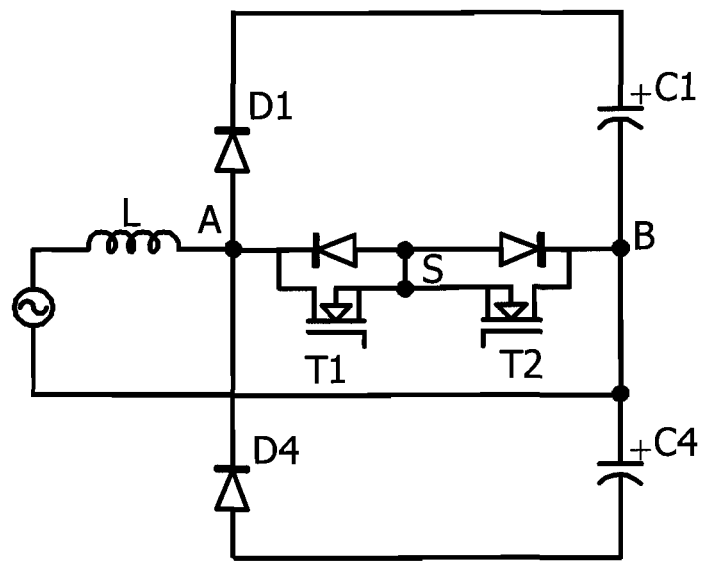
FIG. 2 shows a circuit diagram of another H-bridge PFC circuit in the prior art.
Figure 3A:
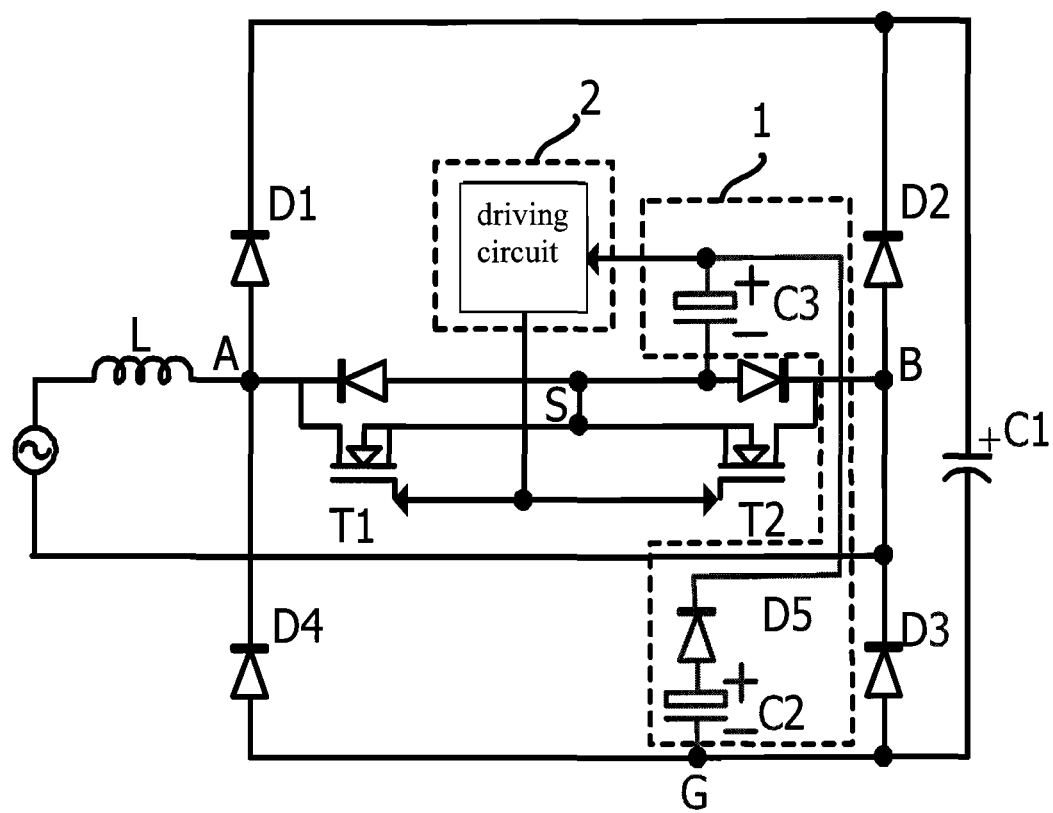
FIG. 3(a) shows a circuit diagram of the H-bridge PFC circuit in FIG. 1 and its bootstrap driver circuit with floating ground structure.
Figure 3B:
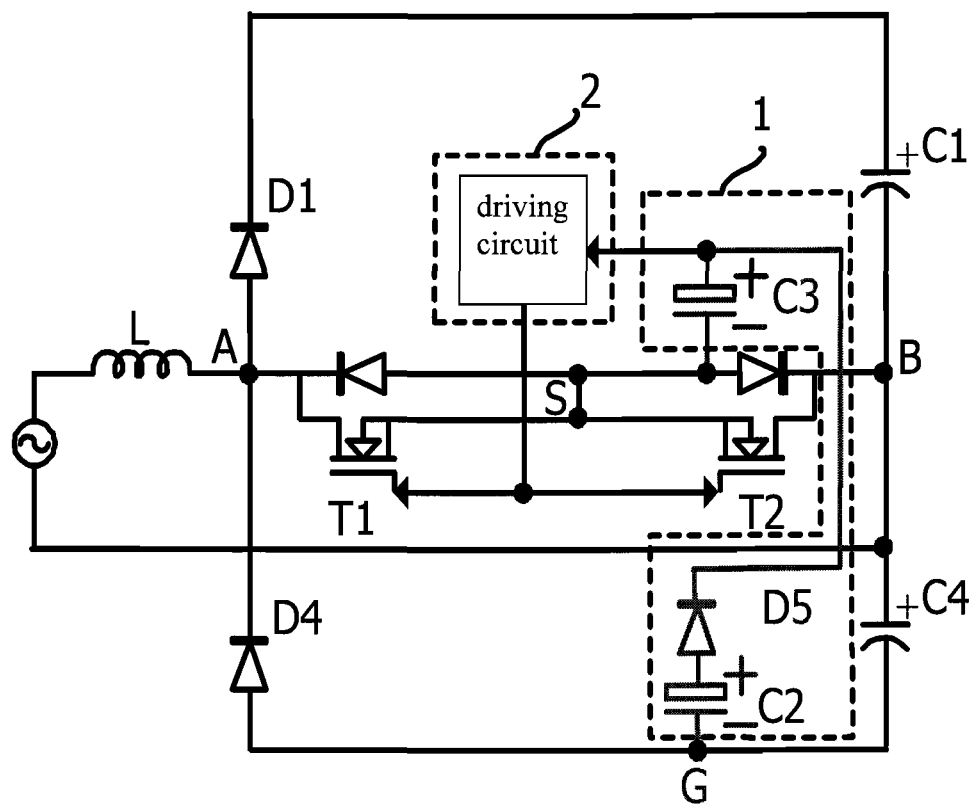
FIG. 3(b) shows a circuit diagram of the H-bridge PFC circuit in FIG. 2 and its bootstrap driver circuit with floating ground structure.
Figure 5:
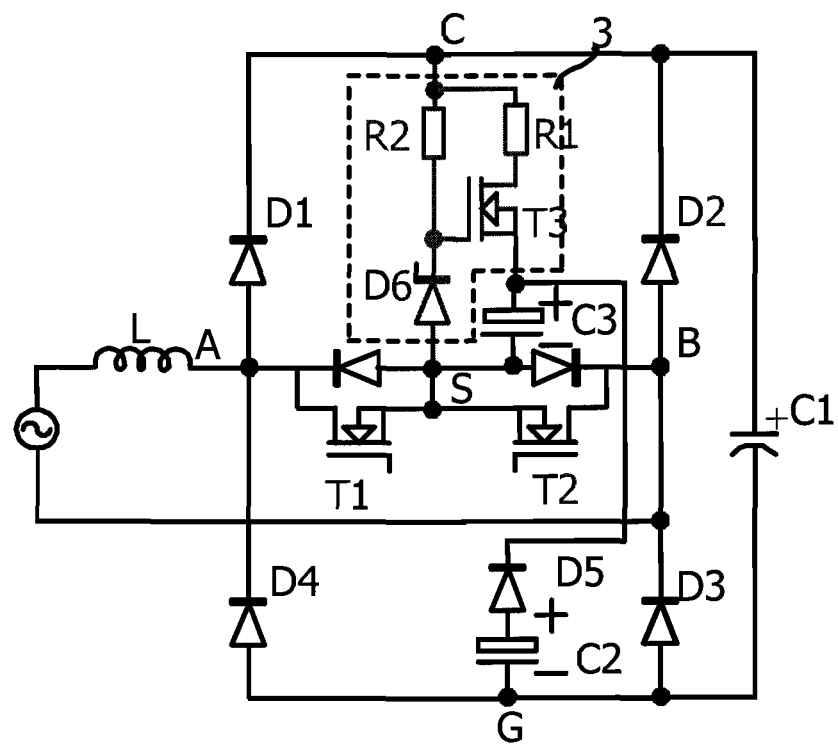
FIG. 5 shows a circuit diagram of the H-bridge PFC circuit in FIG. 3(a) with a bootstrap circuit of the energy compensation circuit added according to the first preferred embodiment of the present invention.

In FIG. 5, it provides a preferred embodiment of the three-terminal network in the dash-lined block 3, wherein T3 is a switch element, e.g., a MOSFET, corresponding to Ts in FIGS. 4(a) and 4(b), and D6 is a stabilivolt e.g Zener diode with the stabilized voltage value (the Zener voltage) of D6 is V. The turn-on threshold voltage between gate and source of T3 is Vgs_th, the voltage across C2 is Vcc, and the effective threshold voltage of the driving circuit in block 2 of FIG. 3(a) is Von_th, that is to say the driving circuit operates normally only when the output voltage of which is higher than Von_th. Thus, the design of the three-terminal network needs to fulfill two conditions simultaneously: $V_Z$-Vgs_th<Vcc and $V_Z$-Vgs_th>Von_th. The first condition is to cause the output voltage of the three-terminal network of FIG. 5 to be less than Vcc so as to guarantee that the three-terminal network does not operate when the bootstrap circuit in the dash-lined block 1 of FIG. 3(a) operates normally. The second condition is to make the output voltage of the three-terminal network to be larger than Von_th so as to guarantee that the driving circuit in the block 2 of FIG. 3(a) gains a potential level being high enough to make the driving circuit operate normally when the bootstrap circuit in the block 1 of FIG. 3(a) does not operate and the three-terminal network in the block 3 of FIG. 5 operates.

The operational principles of the three-terminal network of FIG. 5 are:

If the bootstrap path of bootstrap driver circuit with floating ground structure is interrupted, then the voltage across bootstrap capacitor C3 decreases. After the voltage across C3 reduces to make the voltage between gate and source of T3 be larger than Vgs_th, T3 is turned on and C3 is charged through a new charge loop.

The new charge loop is A->D1->R1->T3->C3->the body diode of T2->B when the voltage value at A is larger than that at B. The new charge loop is B->D2->R1->T3->C3->the body diode of T1->A when the voltage value at B is larger than that at A.

And C3 is charged until the voltage between gate and source of T3 is less than Vgs_th and then T3 is turned off. The voltage across C3 decreases again since the driving circuit consumes the energy of C3, and the above-mentioned process is repeated continuously. Thus, resistors R1, R2, capacitor C3, switch T3 and the zener diode D6 in FIG. 5 form a voltage stabilizing source to maintain the voltage across C3 almost a constant value.

When bootstrap circuit operates normally, D5 is on and the voltage across C3 equals to Vcc (the forward voltage drop of diode D5 is ignored). To satisfy $V_Z$-Vgs_th<Vcc, the voltage between gate and source of T3 Vz-Vcc is less than the turn-on threshold voltage of T3 Vgs_th, thus T3 is kept off which means the energy compensation circuit in the block 3 of FIG. 5 does not operate, and the energy required by C3 is totally provided by the bootstrap circuit in the block 1 of FIG. 3(a).

Figure 6:
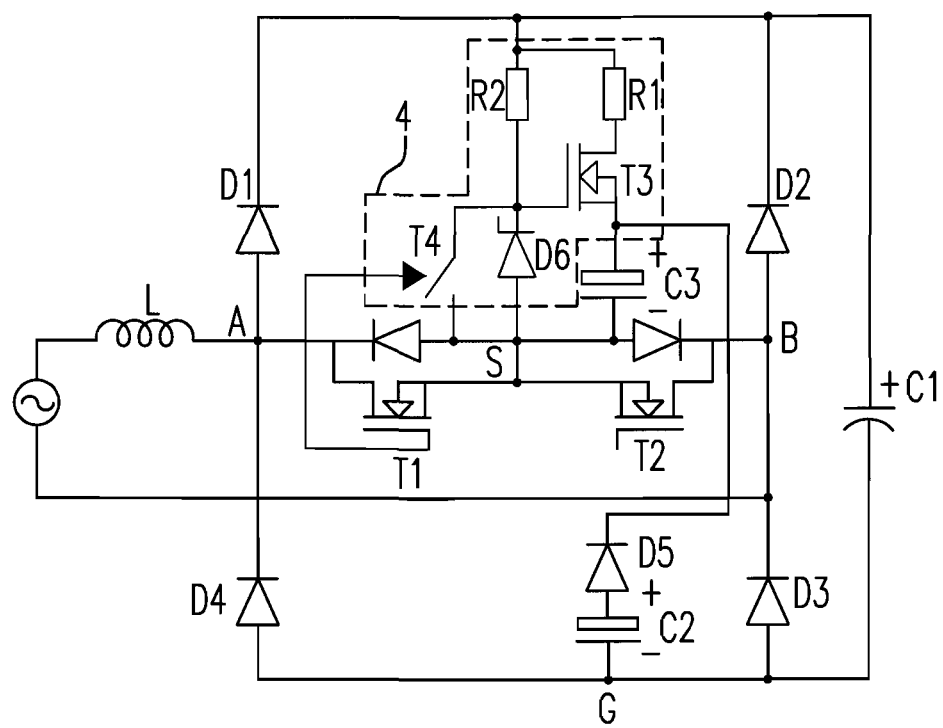
FIG. 6 shows a circuit diagram of the H-bridge PFC circuit in FIG. 4(a) with a bootstrap circuit of the energy compensation circuit and a switch T4 added to decrease the losses of the auxiliary power supply circuit according to the third preferred embodiment of the present invention.

The design of energy compensation circuits in the block 3 of FIGS. 5 and 6 needs to fulfill two conditions: $V_Z$-Vgs_th<Vcc and $V_Z$-Vgs_th>Von_th to provide energy to capacitor C3 when the bootstrap circuit is interrupted. To facilitate the choice of the zener diode D6, the block 4 in FIG. 6 adds a switch T4 based on the block 3 in FIG. 5. The function of switch T4 is to make the three-terminal network shown in the block 3 of FIG. 5 a controllable intermittently-operating circuit. T4 is controlled by the voltage signals between gate and source of T1 or T2. Switch T4 is turned on when the voltage signal between gate and source of T1 or T2 is at a high level, which means that the voltage across C3 is high enough, and C3 possesses sufficient energy to provide to the driving circuit, while T4 is turned off when that is at a low level. When T4 is turned on, the voltage across the diode D6 is clamped to zero, thus T3 is turned off, and the three-terminal network 3 does not operate.

And after T4 is added to the three-terminal network, the threshold value of D6 - - - Vz does not need to fulfill $V_Z$-Vgs_th<Vcc, which provides convenience for the design and product producing.

Figure 7:
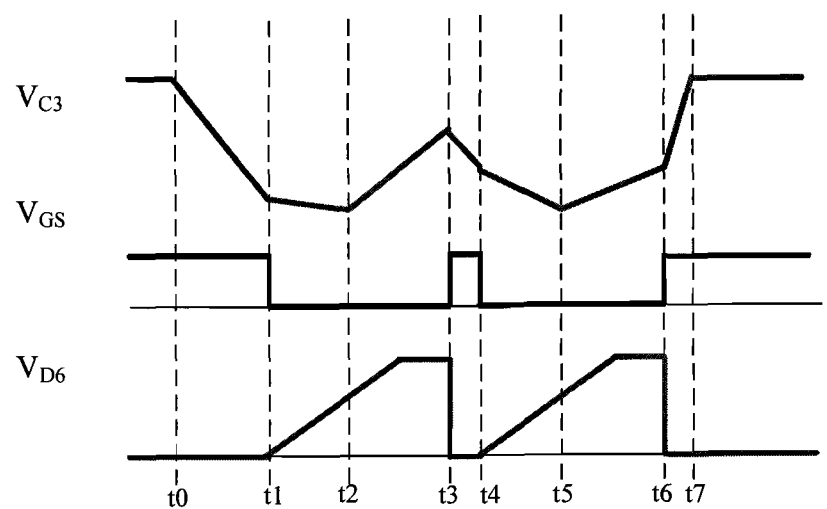
FIG. 7 shows a waveform diagram of the voltage across capacitor C3, $V_{C3}$, voltage signal between gate and source of T1 or T2, $V_{GS}$, and the voltage across diode D6, $V_{D6}$, when the bootstrap circuit added to the H-bridge PFC circuit in FIG. 3(a) could not operate normally.

Besides, the current flows through T3 will result in losses on resistor R1 when switch T3 is on during the operational process of the energy compensation circuit. After T4 is added, loss on R1 is reduced since the three-terminal network operates intermittently. And FIG. 7 shows the waveform of the voltage across capacitor C3 - - - $V_{C3}$, voltage signal between gate and source of T1 or T2 - - - $V_{GS}$, and the voltage across diode D6 - - - $V_{D6}$, when the bootstrap circuit does not operate normally. During the time period of t0-t1, $V_{GS}$ is at a high level; T1 and T2 are turned on; $V_{D6}$ decreases to zero due to the turning-on of T4, and the energy compensation circuit in block 3 does not operate. During t1-t2, $V_{GS}$ is at a low level; T1 and T2 are off, $V_{D6}$ increases gradually; but T3 is still off since voltage between the gate and the source of T3 is not high enough, thus the energy compensation circuit still does not operate. During t2-t3, $V_{D6}$ increases to a level to make T3 turn on and $V_{C3}$ is increased gradually. During t3-t4, $V_{GS}$ is at a high level; $V_{D6}$ is zero; the energy compensation circuit does not operate and $V_{C3}$ decreases gradually. And the aforesaid processes are repeated in the following time periods. Due to the existence of T4, the energy compensation circuit operates intermittently and the loss is relatively small, which is just like the PFC circuit operates in burst mode under the unloaded condition, the light loaded condition, or around the zero-crossings of AC input voltage, and has significant meaning for decreasing the constant losses and raising the efficiency.

In the above-mentioned embodiments, the bootstrap circuit and the energy compensation circuit do not operate simultaneously. But in actual designs, they could operate at the same time, and provide energy to the bootstrap capacitor C3 commonly, thus the condition $V_Z$-Vgs_th<Vcc is not considered.

Figure 8:
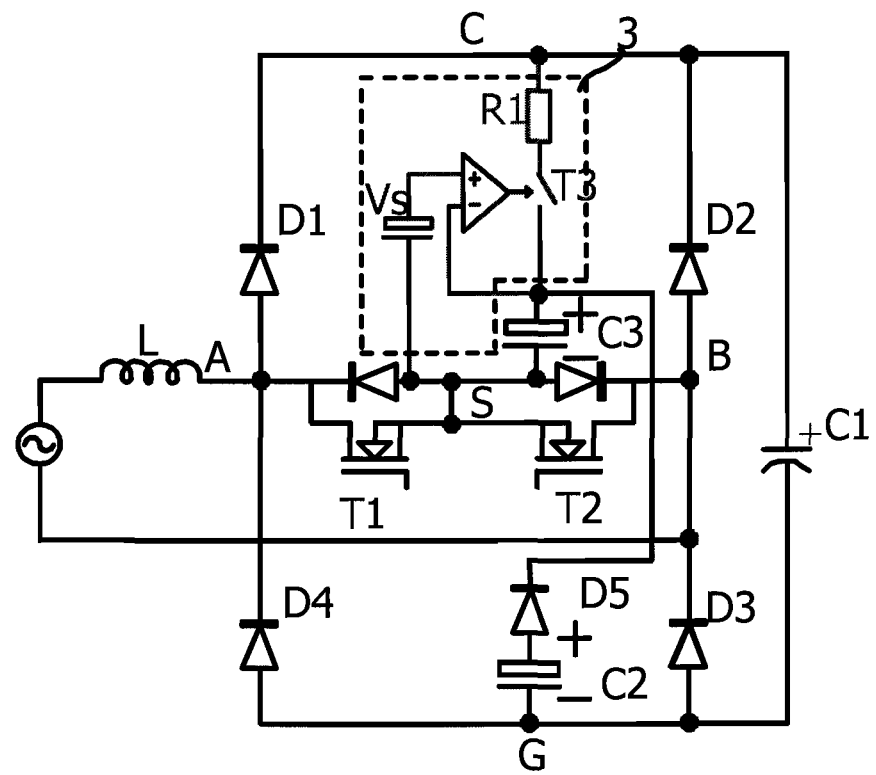
FIG. 8 shows a circuit diagram of the H-bridge PFC circuit in FIG. 4(a) with a bootstrap circuit of the energy compensation circuit added according to the fourth preferred embodiment of the present invention.

FIG. 8 shows still another preferred embodiment of the present invention, wherein T3 is a controllable switch, Vs is a voltage reference source (or a reference voltage device) providing a reference voltage. The comparator compares the reference voltage with the voltage across C3. The comparator outputs a low level signal to turn off T3 when the voltage across C3 is higher than the reference voltage; while the comparator outputs a high level signal to turn on T3 when the voltage across C3 is lower than the reference voltage. The charging path of C3 is A->D1->C->R1->T3->C3->the body diode of T2->B when the voltage value at A is larger than that at B. The charging path of C3 is B->D2->C->R1->T3->C3->the body diode of T1->A when the voltage value at B is larger than that at A.

According to the above descriptions, the present invention provides an H-bridge circuit having a bootstrap circuit with a bootstrap capacitor and an auxiliary circuit, and a controlling method thereof, and the auxiliary circuit provides compensation energy to the bootstrap circuit while the voltage across the bootstrap capacitor is insufficient such as to raise the operational reliability of the bootstrap circuit.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. An H-bridge circuit, comprising:
   an AC power source having a first and a second terminals;
   an H-bridge comprising:
      a first and a second bridge arms, each of which has a first and a second terminals and a middle point, wherein the first terminal of the first bridge arm connects the first terminal of the second bridge arm, the second terminal of the first bridge arm connects the second terminal of the second bridge arm, and the middle point of the first bridge arm and the middle point of the second bridge arm connect the first and the second terminals of the AC power source respectively; and
      a bidirectional switch connected between the two middle points;
   a bootstrap circuit comprising a bootstrap capacitor and providing a bootstrap voltage;
   a driving circuit receiving the bootstrap voltage and driving the bidirectional switch; and
   an energy compensation circuit coupled to the H-bridge, the bootstrap circuit and the driving circuit, and comprising a first, a second and a third terminals, wherein the first and the second terminals are coupled to the AC power source, and the second and the third terminals connect to the bootstrap capacitor to provide a compensation energy to the bootstrap capacitor.

2. A circuit according to claim 1, wherein the bootstrap capacitor has a first terminal and a second terminal connected to the bidirectional switch, and the bootstrap voltage is a voltage across the bootstrap capacitor.

3. A circuit according to claim 2, wherein the bootstrap circuit further comprises a bootstrap switch having a first terminal and a second terminal connected to the first terminal of the bootstrap capacitor, and a storage capacitor having a first terminal connected to the first terminal of the bootstrap switch and a second terminal connected to the second terminals of the first and the second bridge arms.

4. A circuit according to claim 1, wherein the energy compensation circuit comprises a switch element and provides a reference voltage, and the switch element is controlled through comparing the bootstrap voltage with the reference voltage so as to provide the compensation energy to the bootstrap circuit.

5. A circuit according to claim 4, wherein the switch element is turned on and the energy compensation circuit provides the compensation energy to the bootstrap circuit when the bootstrap voltage is lower than the reference voltage, and the switch element is turned off when the bootstrap voltage is higher than the reference voltage such that the energy compensation circuit ceases to provide the compensation energy to the bootstrap circuit.

6. A circuit according to claim 1, wherein the first terminal of the energy compensation circuit connects to the first terminal of the first bridge arm of the H-bridge, the second terminal of the energy compensation circuit connects to the second terminal of the bootstrap capacitor, and the third terminal of the energy compensation circuit connects to the first terminal of the bootstrap capacitor.

7. A circuit according to claim 1, wherein the first terminal of the energy compensation circuit connects to the middle point of the first bridge arm of the H-bridge, the second terminal of the energy compensation circuit connects to the second terminal of the bootstrap capacitor, and the third terminal of the energy compensation circuit connects to the first terminal of the bootstrap capacitor.

8. A circuit according to claim 1, wherein the first terminal of the energy compensation circuit connects to the middle point of the second bridge arm of the H-bridge, the second terminal of the energy compensation circuit connects to the second terminal of the bootstrap capacitor, and the third terminal of the energy compensation circuit connects to the first terminal of the bootstrap capacitor.

9. A circuit according to claim 1, wherein the bidirectional switch comprises a first switch and a second switch connected to the first switch in series, and the first and the second switches are two inverse series-connected MOSFETs.

10. A circuit according to claim 1, wherein the energy compensation circuit further comprises a first and a second resistors, each of which has a first and a second terminals, a diode having an anode connected to the second terminal of the energy compensation circuit, a cathode and a stabilized voltage, and a switch element having a first terminal connected to the second terminal of the first resistor, a second terminal connected to the third terminal of the energy compensation circuit and a control terminal connected to the second terminal of the second resistor and the cathode of the diode, the first terminals of the first and the second resistors are both connected to the first terminal of the energy compensation circuit, and the switch element is controlled by comparing the bootstrap voltage with the stabilized voltage of the diode so as to provide the compensation energy to the bootstrap circuit.

11. A circuit according to claim 10, wherein the switch element is a third switch, the energy compensation circuit further comprises a fourth switch having a first terminal connected to the cathode of the diode, a second terminal connected to the anode of the diode and a control terminal receiving a control signal of the bidirectional switch, the fourth switch is turned on when the control signal of the bidirectional switch is at a relatively high level, and turned off when the control signal of the bidirectional switch is at a relatively low level.

12. A circuit according to claim 1, wherein the energy compensation circuit further comprises a resistor having a first terminal connected to the first terminal of the energy compensation circuit and a second terminal, a comparator having a non-inverting input terminal, an inverting input terminal and an output terminal, a reference voltage device providing a reference voltage and having a first terminal connected to the non-inverting input terminal of the comparator and a second terminal connected to the second terminal of the energy compensation circuit, and a switch element having a first terminal connected to the second terminal of the resistor, a second terminal connected to the third terminal of the energy compensation circuit and the inverting input terminal of the comparator, and a control terminal connected to the output terminal of the comparator, and the energy compensation circuit controls the switch element through comparing the bootstrap voltage with the reference voltage so as to provide the compensation energy to the bootstrap circuit.

13. A circuit according to claim 1 further comprising an output capacitor having a first terminal and a second terminal, wherein the first bridge arm further comprises a first and a fourth diodes, the second bridge arm further comprises a second and a third diodes, each of the diodes has an anode and a cathode, the cathode of the first diode connects to the cathode of the second diode and the first terminal of the output capacitor, the anode of the first diode connects to the cathode of the fourth diode to form the middle point of the first bridge arm, the anode of the second diode connects to the cathode of the third diode to form the middle point of the second bridge arm, and the anode of the fourth diode connects to the anode of the third diode and the second terminal of the output capacitor.

14. A circuit according to claim 1, wherein the first bridge arm further comprises a first and a second diodes, the second bridge arm further comprises a first and a second output capacitors, each of the diodes has an anode and a cathode and each of the capacitors has a first terminal and a second terminal, the cathode of the first diode connects to the first terminal of the first output capacitor, the anode of the first diode connects to the cathode of the second diode to form the middle point of the first bridge arm, the second terminal of the first output capacitor connects to the first terminal of the second output capacitor to form the middle point of the second bridge arm, and the anode of the second diode connects to the second terminal of the second output capacitor.

15. A circuit according to claim 1 being an H-bridge power factor correction circuit.

16. A controlling method for an H-bridge circuit comprising an H-bridge having a biodirectional switch, a bootstrap circuit, a driving circuit and an energy compensation circuit, wherein the method comprises the steps of: providing a bootstrap voltage by the bootstrap circuit; receiving the bootstrap voltage by the driving circuit to drive the biodirectional switch; and raising the bootstrap voltage to a first predetermined value by providing an energy to the bootstrap circuit through the energy compensation circuit when the bootstrap voltage is lower than a second predetermined value; the H-bridge circuit is an H-bridge circuit comprising:
an AC power source having a first and a second terminals;
an H-bridge comprising:
a first and a second bridge arms, each of which has a first and a second terminals and a middle point, wherein the first terminal of the first bridge arm connects the first terminal of the second bridge arm, the second terminal of the first bridge arm connects the second terminal of the second bridge arm, and the middle point of the first bridge arm and the middle point of the second bridge arm connect the first and the second terminals of the AC power source respectively; and
a bidirectional switch connected between the two middle points;
a bootstrap circuit providing a bootstrap voltage comprising a bootstrap capacitor having a first terminal and a second terminal connected to the bidirectional switch, and the bootstrap voltage is a voltage across the bootstrap capacitor;
a driving circuit receiving the bootstrap voltage and driving the bidirectional switch; and
an energy compensation circuit coupled to the H-bridge, the bootstrap circuit and the driving circuit, and providing a compensation energy to the bootstrap circuit, the energy compensation circuit comprising a first, a second and a third terminals, the first and the second terminals are coupled to the AC power source, and the second and the third terminals connect to the bootstrap capacitor to provide an energy to the bootstrap capacitor, the energy compensation circuit further comprises a switch element and provides a reference voltage, and the switch element is controlled through comparing the bootstrap voltage with the reference voltage so as to provide the compensation energy to the bootstrap circuit, and the raising step further comprises the steps of:
turning on the switch element to charge and store an energy in the bootstrap capacitor when the bootstrap voltage is lower than the second predetermined value;
turning off the switch element when the bootstrap voltage is larger than the first predetermined value.

17. A controlling method for an H-bridge circuit comprising an H-bridge having a biodirectional switch, a bootstrap circuit, a driving circuit and an energy compensation circuit, wherein
the method comprises the steps of: providing a bootstrap voltage by the bootstrap circuit; receiving the bootstrap voltage by the driving circuit to drive the biodirectional switch; and raising the bootstrap voltage to a first predetermined value by providing an energy to the bootstrap circuit through the energy compensation circuit when the bootstrap voltage is lower than a second predetermined value;
the H-bridge circuit is an H-bridge circuit comprising:
an AC power source having a first and a second terminals;
an H-bridge comprising:
a first and a second bridge arms, each of which has a first and a second terminals and a middle point, wherein the first terminal of the first bridge arm connects the first terminal of the second bridge arm, the second terminal of the first bridge arm connects the second terminal of the second bridge arm, and the middle point of the first bridge arm and the middle point of the second bridge arm connect the first and the second terminals of the AC power source respectively; and
a bidirectional switch connected between the two middle points;
a bootstrap circuit providing a bootstrap voltage comprising a bootstrap capacitor having a first terminal and a second terminal connected to the bidirectional switch, and the bootstrap voltage is a voltage across the bootstrap capacitor;
a driving circuit receiving the bootstrap voltage and driving the bidirectional switch; and
an energy compensation circuit coupled to the H-bridge, the bootstrap circuit and the driving circuit, and providing a compensation energy to the bootstrap circuit, the energy compensation circuit comprising a first, a second and a third terminals, the first and the second terminals are coupled to the AC power source, and the second and the third terminals connect to the bootstrap capacitor to provide an energy to the bootstrap capacitor and further comprises a first and a second resistors, each of which has a first and a second terminals, a diode having an anode connected to the second terminal of the energy compensation circuit, a cathode and a stabilized voltage, and a switch element having a first terminal connected to the second terminal of the first resistor, a second terminal connected to the third terminal of the energy compensation circuit and a control terminal connected to the second terminal of the second resistor and the cathode of the diode, the first terminals of the first and the second resistors are both connected to the first terminal of the energy compensation circuit, and the switch element is controlled by comparing the bootstrap voltage with the stabilized voltage of the diode so as to provide the compensation energy to the bootstrap circuit, wherein the switch element is a third switch, the energy compensation circuit further comprises a fourth switch having a first terminal connected to the cathode of the diode, a second terminal connected to the anode of the diode and a control terminal receiving a control signal of the bidirectional switch, the fourth switch is turned on when the control signal of the bidirectional switch is at a relatively high level, and turned off when the control signal of the bidirectional switch is at a relatively low level, and the raising step further comprises the steps of:

turning on the fourth switch to turn off the third switch so as to cease an operation of the energy compensation circuit when the control signal of the bidirectional switch is at the relatively high level; and turning off the fourth switch to turn on the third switch so as to begin the operation of the energy compensation circuit when the control signal of the bidirectional switch is at the relatively low level, wherein the control signal is a pulse signal.

* * * * *